US012260639B2

(12) United States Patent
Frost et al.

(10) Patent No.: US 12,260,639 B2
(45) Date of Patent: Mar. 25, 2025

(54) ANNOTATING A VIDEO WITH A PERSONALIZED RECAP VIDEO BASED ON RELEVANCY AND WATCH HISTORY

(71) Applicant: INTERNATIONAL BUSINESS MACHINES CORPORATION, Armonk, NY (US)

(72) Inventors: Keith Gregory Frost, Delaware, OH (US); Vincent Tkac, Delaware, OH (US); Andrew C Myers, Columbus, OH (US); Joshua M Rice, Marysville, OH (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 17/454,666

(22) Filed: Nov. 12, 2021

(65) Prior Publication Data

US 2023/0154184 A1  May 18, 2023

(51) Int. Cl.
*G06F 18/22* (2023.01)
*G06V 20/20* (2022.01)
(Continued)

(52) U.S. Cl.
CPC .............. *G06V 20/20* (2022.01); *G06F 18/22* (2023.01); *G06V 20/46* (2022.01); *G06V 20/48* (2022.01);
(Continued)

(58) Field of Classification Search
None
See application file for complete search history.

(56) References Cited

U.S. PATENT DOCUMENTS 6,535,639 B1   3/2003 Uchihachi
6,961,954 B1  11/2005 Maybury
(Continued)

FOREIGN PATENT DOCUMENTS

EP    2240251 A1  10/2018
WO  2009102991 A1   8/2009

OTHER PUBLICATIONS

Baraldi, et al., "A Deep Siamese Network for Scene Detection in Broadcast Videos," [Conference Paper], Oct. 2015, 5 pages, DOI:10.1145/2733373.2806316, ResearchGate, Retrieved from the Internet: <URL: https://www.researchgate.net/publication/280716534_A_Deep_Siamese_Network_for_Scene_Detection_in_Broadcast_Videos>.

(Continued)

Primary Examiner — Tsung Yin Tsai
(74) Attorney, Agent, or Firm — Steven M. Bouknight

(57) ABSTRACT

A method for automatically annotating an intended video with at least one personalized recap video based on previously viewed videos is provided. The method may include automatically tracking user viewership of the previously viewed videos, and in response to detecting an intention to view the intended video: automatically identifying and extracting a subset of video footage from one or more of the previously viewed videos based on the tracked user viewership and based on a determined relevancy of the subset of video footage to content in the intended video; generating the at least one personalized recap video by compiling and sorting the extracted subset of video footage from the one or more previously viewed videos into a compilation video; and annotating the intended video with the at least one personalized video by presenting the at least one personalized recap video on the intended video.

20 Claims, 6 Drawing Sheets

(51) Int. Cl.
  *G06V 20/40* (2022.01)
  *G10L 15/26* (2006.01)
  *H04N 21/442* (2011.01)
(52) U.S. Cl.
  CPC ....... *G10L 15/26* (2013.01); *H04N 21/44204* (2013.01)

(56) References Cited

U.S. PATENT DOCUMENTS

| | | | |
|---|---|---|---|
| 10,311,913 | B1 | 6/2019 | Shekhar |
| 10,341,728 | B2 | 7/2019 | Girlando |
| 10,390,082 | B2* | 8/2019 | Song ................. H04N 21/8549 |
| 10,555,023 | B1* | 2/2020 | McCarthy .......... H04N 21/8549 |
| 10,565,177 | B2 | 2/2020 | Gausman |
| 10,984,667 | B2 | 4/2021 | Raynaud |
| 2002/0051077 | A1* | 5/2002 | Liou .................. H04N 21/8549 348/E7.063 |
| 2010/0104261 | A1* | 4/2010 | Liu ........................ H04N 5/147 348/576 |
| 2016/0092561 | A1* | 3/2016 | Liu ..................... G06F 16/7837 386/230 |
| 2016/0173941 | A1* | 6/2016 | Gilson ................. H04N 21/812 725/14 |
| 2017/0040037 | A1* | 2/2017 | Hunt ......................... G06F 8/73 |
| 2017/0289617 | A1* | 10/2017 | Song ................. H04N 21/4666 |
| 2018/0343482 | A1* | 11/2018 | Loheide ........... H04N 21/26241 |
| 2019/0104342 | A1* | 4/2019 | Catalano ........... H04N 21/4532 |
| 2019/0306215 | A1* | 10/2019 | Bastide ................. H04L 65/612 |
| 2020/0194035 | A1* | 6/2020 | Catalano ............ H04N 21/4667 |

OTHER PUBLICATIONS

Baraldi, et al., "Recognizing and Presenting the Storytelling Video Structure with Deep Multimodal Networks," Sep. 2014, IEEE Transactions on Multimedia, vol. 13, No. 9, Sep. 2014, pp. 1-14, arXiv:1610.0137v2 [cs.CV] Nov. 10, 2016 (followed by URL), Retrieved from the Internet: <URL: https://arxiv.org/abs/1610.01376>.

Disclosed Anonymously, "Hybrid push/on-demand content provision," IP.com Prior Art Database Technical Disclosure, Sep. 17, 2009, 3 Pages. IP.com No. IPCOM000187738D, Retrieved from the Internet: <URL: https://priorart.ip.com/IPCOM/000187738>.

Disclosed Anonymously, "Mechanism for Queuing Live Stream Content in a Media Content Display Queue," IP.com Prior Art Database Technical Disclosure, Jan. 5, 2018, 9 pages, IP.com No. IPCOM000252367D, Retrieved from the Internet: <URL: https://priorart.ip.com/IPCOM/000252367>.

Disclosed Anonymously, "Method and System for Personalized Video Recap of Serialized Video Content," IP.com Prior Art Database Technical Disclosure, Aug. 16, 2018, 5 pages, IP.com No. IPCOM000254959D, Retrieved from the Internet: <URL: https://priorart.ip.com/IPCOM/000254959>.

Disclosed Anonymously, "System Method or Apparatus for Exchanging Knowledge, Information, Products or Any Entity(ies) of Value and Real Time Market and/or Individual Sensitive or Responsive System of Education," IP.com Prior Art Database Technical Disclosure, Jan. 1, 2009, 14 pages, IP.com No. IPCOM000177784D, Retrieved from the Internet: <URL: https://priorart.ip.com/IPCOM/000177784>.

Popescu-Belis, et al., "Building and Using a Corpus of Shallow Dialogue Annotated Meetings," Proceedings of the Fourth International Conference on Language Resources and Evaluation (LREC'04), May 2004, 6 pages, European Language Resources Association (ELRA), Lisbon, PT, Retrieved from the Internet: URL: <https://aclanthology.org/L04-1365/>.

Mell et al., "The NIST Definition of Cloud Computing", Recommendations of the National Institute of Standards and Technology, NIST Special Publication 800-145, Sep. 2011, 7 pages.

* cited by examiner

ANNOTATING A VIDEO WITH A PERSONALIZED RECAP VIDEO BASED ON RELEVANCY AND WATCH HISTORY

BACKGROUND

The present invention relates generally to the field of computing, and more specifically, to annotating a video in an episodic collection of videos with a generated and personalized recap video.

Generally, online streaming media may include multimedia content that is delivered and consumed in a continuous manner from a source, whereby the term streaming may generally refer to the delivery method of the multimedia content rather than the content itself. For example, most traditional media delivery systems are either inherently streaming (e.g. radio, television) or inherently non-streaming (e.g. books, videotape, audio CDs). Online streaming is an alternative to file downloading, a process in which the end-user obtains an entire file of the multimedia content before watching or listening to the content. However, through online streaming, an end-user can use a media player to start playing digital video or digital audio content before the entire file has been transmitted. In either case, online streaming and file downloading are most prevalent in video on demand, television services, and other services such as music and video games. For television services, binge-watching (also called binge-viewing or marathon-viewing) has become a common method among viewers for streaming/consuming episodic content (e.g. a series of videos/episodes), whereby the process of binge-watching may include watching the series of episodes, usually of a single television show, for a prolonged time span within one sitting.

SUMMARY

A method for automatically annotating an intended video with at least one personalized recap video based on previously viewed videos is provided. The method may include automatically tracking user viewership of the previously viewed videos, and in response to detecting an intention to view the intended video: automatically identifying and extracting a subset of video footage from one or more of the previously viewed videos based on the tracked user viewership and based on a determined relevancy of the subset of video footage to content in the intended video; generating the at least one personalized recap video by compiling and sorting the extracted subset of video footage from the one or more previously viewed videos into a compilation video; and annotating the intended video with the at least one personalized video by presenting the at least one personalized recap video on the intended video.

A computer system for automatically annotating an intended video with at least one personalized recap video based on previously viewed videos is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include automatically tracking user viewership of the previously viewed videos, and in response to detecting an intention to view the intended video: automatically identifying and extracting a subset of video footage from one or more of the previously viewed videos based on the tracked user viewership and based on a determined relevancy of the subset of video footage to content in the intended video; generating the at least one personalized recap video by compiling and sorting the extracted subset of video footage from the one or more previously viewed videos into a compilation video; and annotating the intended video with the at least one personalized video by presenting the at least one personalized recap video on the intended video.

A computer program product for automatically annotating an intended video with at least one personalized recap video based on previously viewed videos is provided. The computer program product may include one or more computer-readable storage devices and program instructions stored on at least one of the one or more tangible storage devices, the program instructions executable by a processor. The computer program product may include program instructions to automatically tracking user viewership of the previously viewed videos, and in response to detecting an intention to view the intended video: automatically identifying and extracting a subset of video footage from one or more of the previously viewed videos based on the tracked user viewership and based on a determined relevancy of the subset of video footage to content in the intended video; generating the at least one personalized recap video by compiling and sorting the extracted subset of video footage from the one or more previously viewed videos into a compilation video; and annotating the intended video with the at least one personalized video by presenting the at least one personalized recap video on the intended video.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
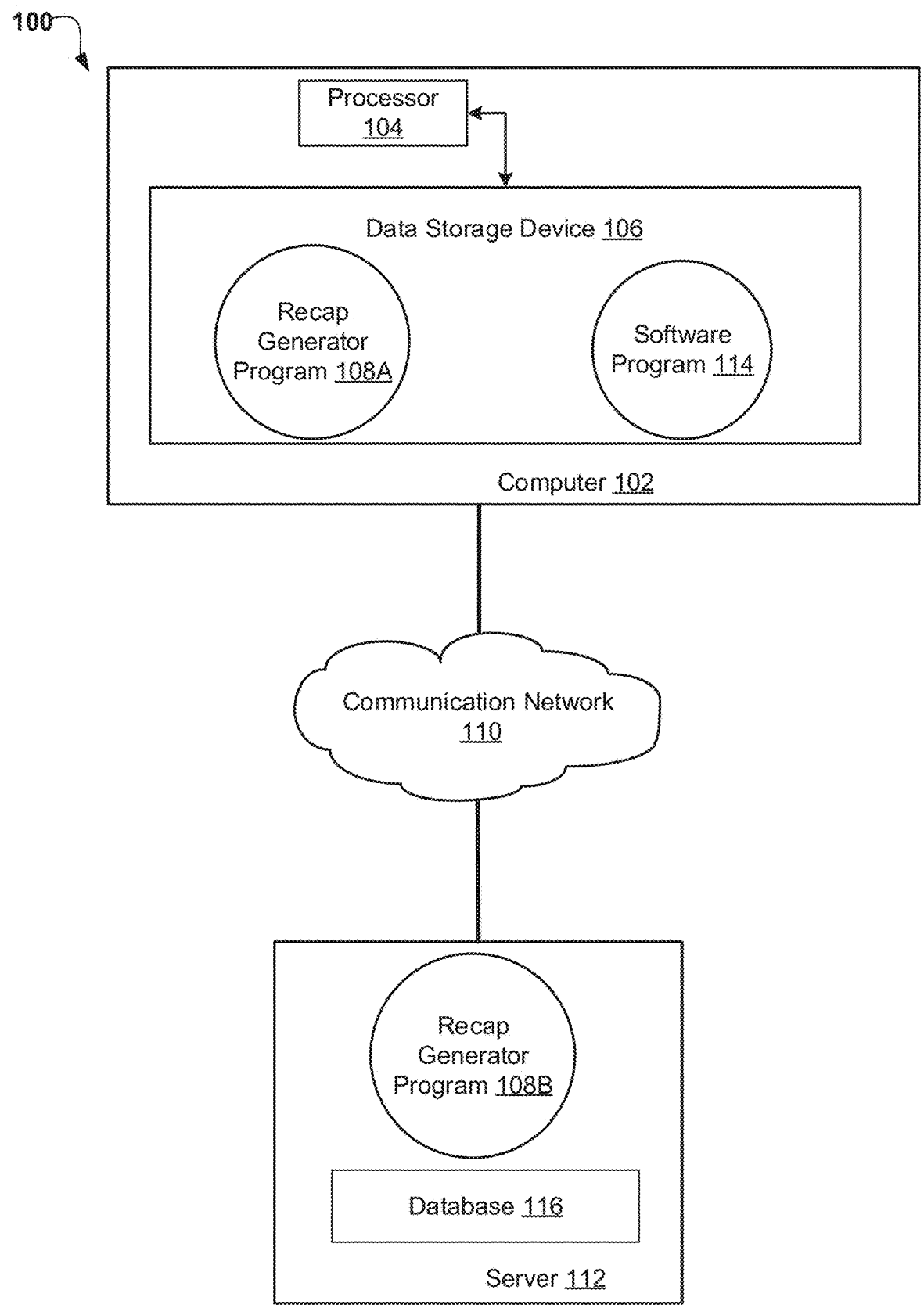
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to automatically annotating a video with a generated and personalized recap video in response to detecting an intention by a user to view the video. Specifically, for example, the video may be an unwatched episode from an episodic collection of videos that are associated with a television series that a user intends to stream/view. Accordingly, the present invention may annotate the unwatched episode in response to detecting the user's intention to view the unwatched episode by generating and presenting a personalized recap video, whereby generating the personalized recap video may include automatically selecting and generating a compilation of previously viewed video content from previously viewed episodes, and whereby the compilation of previously viewed video content may be selected and generated based on a determined relevancy of the previously viewed video content to the content included in the unwatched episode. Additionally, and as will be further described with respect to FIGS. 2A and 2B, the present invention may also generate the personalized recap video based on a determination of an amount of time spent between watching episodes of the collection of episodes. In turn, the present invention may display/present the generated and personalized recap video at a point in time on the unwatched episode that the user intends to view. Therefore, the exemplary embodiments have the capacity to improve the technical field associated with streaming media, as well as multimedia in general, by presenting a personalized recap video for an unwatched video based on previous video content actually viewed by a user and in response to detecting an intention by a user to view the unwatched video, whereby the personalized recap video is based in part on a determined relationship between the previously viewed video content and the content included in the unwatched video.

As previously described with respect to streaming media, binge-watching has become a common method among viewers for streaming/consuming episodic content (e.g. a series of videos/episodes), whereby the process of binge-watching may include watching the series of episodes, usually of a single television show, for a prolonged time span within one sitting. However, with the onset of streaming and binge-watching as a way to consume media, difficulties arise when trying to keep track of certain details of a particular series or show's storyline. Specifically, for example, users may watch multiple episodes of a given television series at different times/frequencies whereby a user may either watch an entire season of a television series in a weekend or go months between episodes. Furthermore, certain topics and entities may be covered at different frequencies as well. For example, a certain character/entity or topic may appear in an early episode of a television series but may not appear and/or be referenced again until multiple episodes down the line in the television series. Thus, in some cases, users may lose track of a storyline based on a frequency with which a user consumes a television series as well as based on frequencies with which entities and topics are covered in episodes of a television series.

Therefore, it may be advantageous, among other things, to provide a method, computer system, and computer program product for automatically, cognitively, and dynamically annotating an video with a generated and personalized recap video in response to detecting an intention to view the video. Specifically, for each episodic series of videos (i.e. the collection of videos/episodes of a given television series/show), the method, computer system, and computer program product may process each video/episode associated with the episodic series by using a speech-to-text algorithm to produce a transcript of the audio of each video/episode with timestamps. Furthermore, the method, computer system, and computer program product may use an image recognition algorithm to identify entities and actions in each video/episode associated with the corresponding timestamps. Furthermore, based on the transcribed audio content and the identified entities and actions, the method, computer system, and computer program product may use a topic modeling algorithm and a change point algorithm to identify topics in each video/episode as well as changes in topics (for example, from scene to scene) based on the timestamps. Thereafter, the method, computer system, and computer program product may track a user's viewership history as a user views/consumes a video/episode from the collection. Then, in response to detecting a user's intention to view a video/episode, which may be an unwatched video from the episodic series of videos/episodes, the method, computer system, and computer program product may automatically identify the topics and entities associated with the unwatched video/episode. In turn, the method, computer system, and computer program product may automatically and dynamically identify and generate a compilation of previously viewed video content based on previously watched videos/episodes according to the tracked user's viewership history, whereby the compilation of previously viewed video content is specifically relevant to the topics and entities in the unwatched video/episode. Furthermore, the method, computer system, and computer program product may automatically present the compilation of previously viewed video content at a point in time on the unwatched video/episode as the user views the unwatched video/episode.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a computer 102 with a processor 104 and a data storage device 106 that is enabled to run a recap generator program 108A and a software program 114, and may also include a microphone (not shown). The software program 114 may include one or multiple application programs such as a broadcasting program, streaming program, internet program, and/or one or more mobile apps running on a computer 102. The recap generator program 108A may communicate with the software program 114. The networked computer environment 100 may also include a server 112 that is enabled to run a recap generator program 108B and the communication network 110. The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with server computer 112 via the communications network 110. The communications network 110 may include connections, such as wire, wireless communication links, or fiber optic cables. As will be discussed with reference to FIG. 3, server computer 112 may include internal components 710a and external components 750a, respectively, and client computer 102 may include internal components 710b and external components 750b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a set-top box media device, a personal digital assistant, a netbook, a laptop computer, a tablet computer, a desktop computer, an internet of things (IoT) device, or any type of computing device capable of running a program and accessing a network. According to various implementations of the present embodiment, the recap generator program 108A, 108B may interact with a database 116 that may be embedded in various storage devices, such as, but not limited to, a mobile device 102, a networked server 112, or a cloud storage service. The database 116 may store data associated with videos/episodes of a television series as well as data based on tracked user viewership of the videos/episodes.

According to the present embodiment, a program, such as a recap generator program 108A and 108B may run on the computer 102 and/or on the server computer 112 via a communications network 110. The recap generator program 108A, 108B may automatically, cognitively, and dynamically annotate a video with a generated and personalized recap video in response to detecting an intention to view the video. Specifically, the computer 102, such as a set-top device and/or mobile device, may run a recap generator program 108A, 108B that may be included in and/or interact with a software program 114, such as a digital streaming application, to receive episodic content whereby the episodic content may include a collection or series of videos/episodes associated with a television show/series. The recap generator program 108A, 108B may also track when a user views the episodic content such as by tracking which videos/episodes are viewed by the user and when the videos/episodes are viewed. Furthermore, in response to detecting a user's intention to view a video/episode (which may be an unwatched video) from the collection of episodes, the recap generator program 108A, 108B may annotate the unwatched episode by generating and presenting a personalized recap video at a point in time on the video. Specifically, for example, the recap generator program 108A, 108B may generate the personalized recap video by automatically selecting and generating a compilation of previously viewed video content from previously viewed videos/episodes, whereby the compilation of previously viewed video content may be selected and generated based on a determined relevancy of the previously viewed video content to the content included in the intended video/episode. Additionally, and as will be further described with respect to FIGS. 2A and 2B, the present invention may also generate the personalized recap video based on a determination of an amount of time spent between watching episodes associated with the collection of episodes. In turn, the present invention may display/present the generated and personalized recap video at a point in time on the unwatched episode that the user intends to view.

Figure 2A:
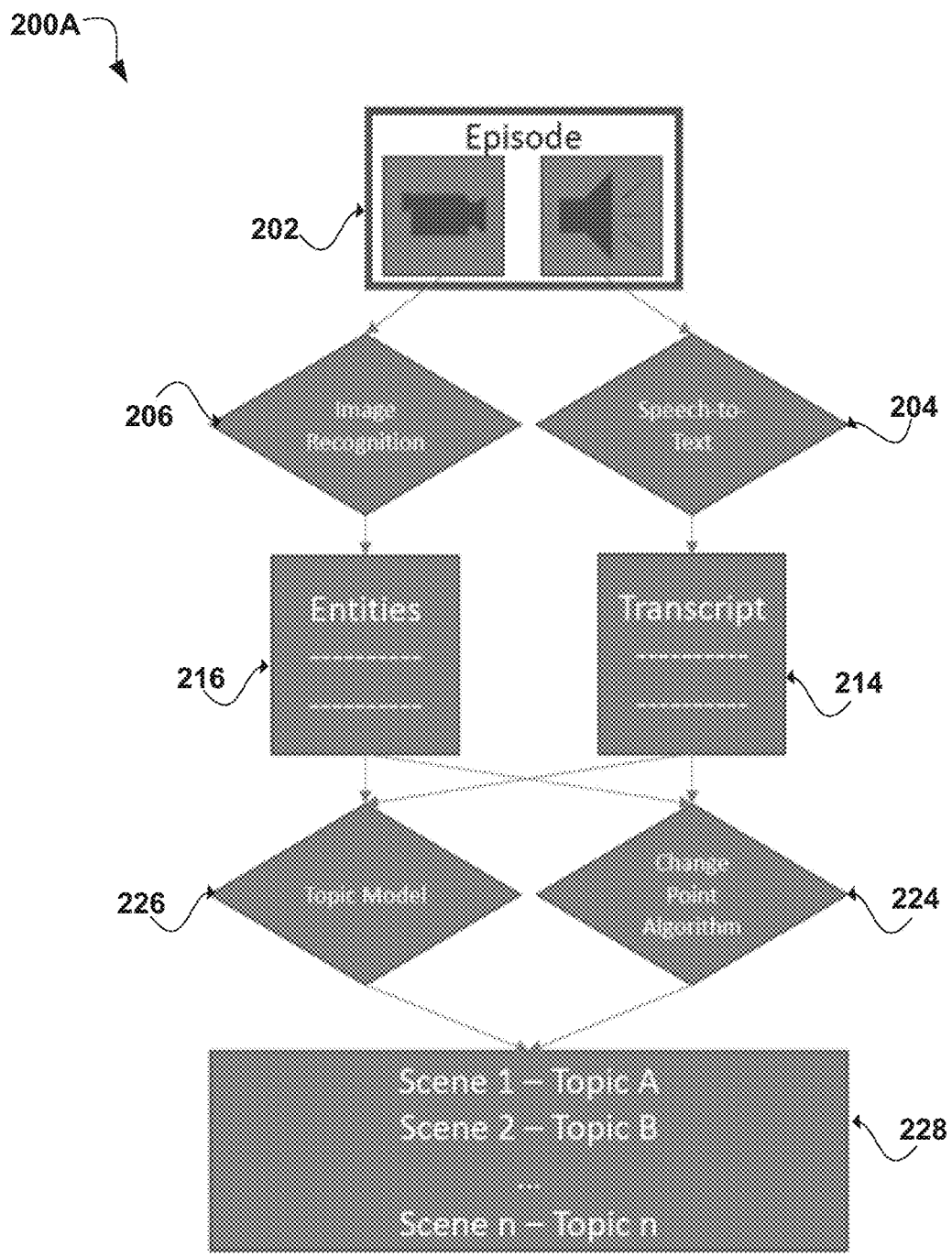
FIG. 2A is an operational flowchart illustrating the steps carried out by a program during a pre-processing stage for automatically and cognitively annotating a video with a generated and personalized recap video according to one embodiment.
Figure 2B:
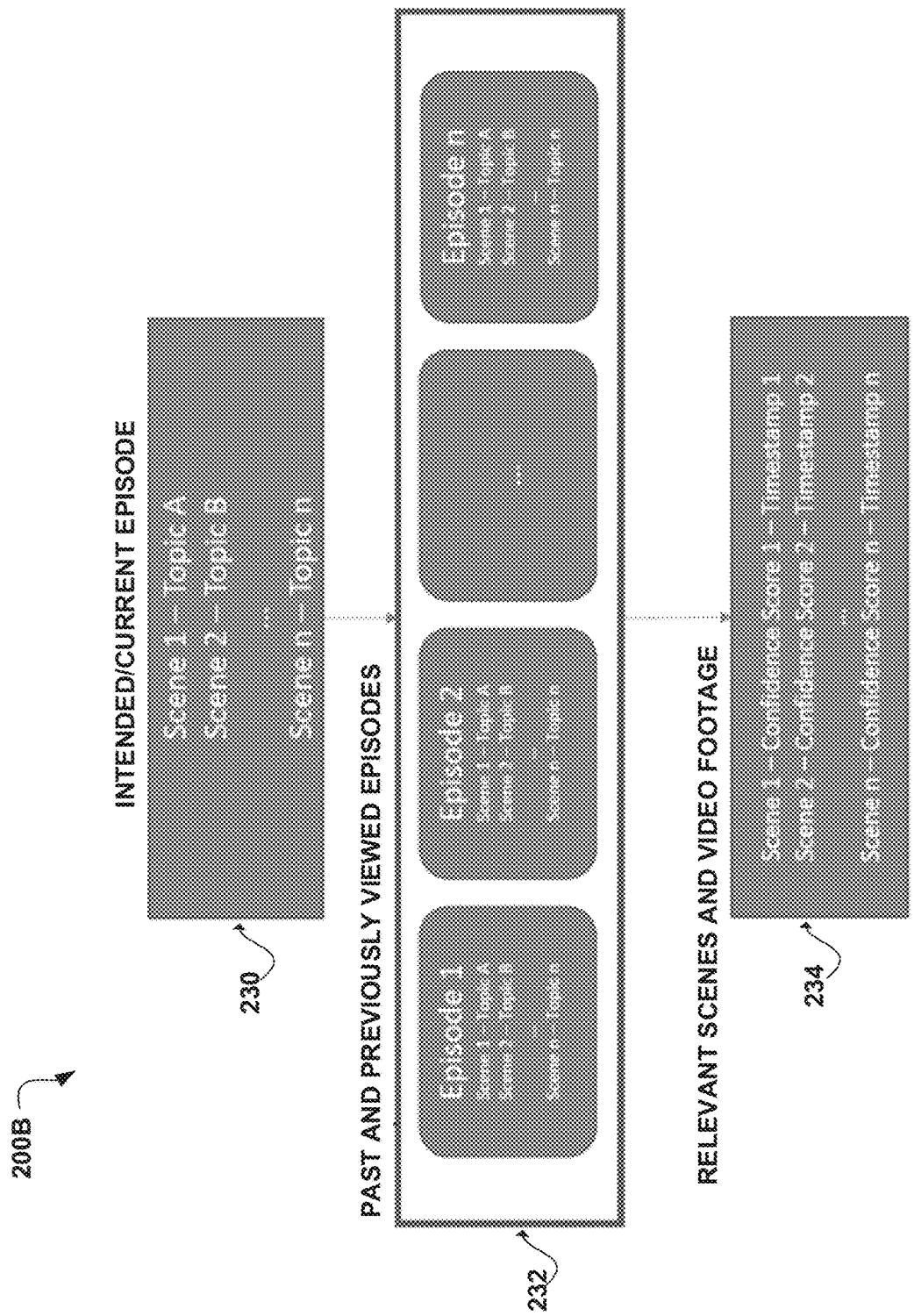
FIG. 2B is an operational flowchart illustrating the steps carried out by a program for automatically and cognitively annotating a video with a generated and personalized recap video according to one embodiment

Referring now to FIGS. 2A and 2B, operational flowcharts 200A and 200B illustrating the steps carried out by a program for automatically and cognitively annotating a video with a generated and personalized recap video according to one embodiment is depicted. Specifically, and as will be described in FIG. 2A, each video/episode, which may be part of an episodic series or collection of videos/episodes associated with a television series, may initially enter a pre-processing stage to identify content within each video/episode. For example, an episodic collection/series of videos/episodes associated with a television show may be released via a streaming service such as Netflix® (Netflix and all Netflix-based trademarks and logos are trademarks or registered trademarks of Netflix, Inc. and/or its affiliates). As such, and as previously described in FIG. 1, the computer 102 may run a recap generator program 108A, 108B that may be included in and/or interact with a software program 114, such as a Netflix® application and/or a web browser which may be running Netflix®, to initially receive the released videos/episodes as depicted at 202. For example, according to one embodiment, the recap generator program 108A, 108B may receive the episodic collection/series of episodes (such as for a specific season or multiple seasons) all at once and/or incrementally, such as episode by episode (i.e. as each episode is released). According to one embodiment, each episode/video may include audio content and video content (as well as closed captioning content).

As depicted at 204 in FIG. 2A, in response to receiving a video/episode 202 associated with the episodic series of videos/episodes, the recap generator program 108A, 108B may automatically initiate a pre-processing stage for each video/episode by using a speech-to-text algorithm and/or service 204 to generate a transcript 214 of the audio content. For example, the recap generator program 108A, 108B may use known speech-to-text algorithms such as Perception Linear Prediction (PLP) and feature extraction, deep learning neural network, Viterbi search, discrimination training, WFST-based (weighted finite state transducer) log linear framework for speaking style. Also, for example, the transcribed audio content 214 may include dialogue between characters in the video/episode and timestamp data associated with the dialogue. Furthermore, and as depicted at 206, the recap generator program 108A, 108B may use an image recognition algorithm and/or service to identify different entities and objects 216 in each video/episode as well as the timestamp data corresponding to the different entities and objects. For example, the recap generator program 108A, 108B may use known image recognition algorithms (for object recognition and face recognition) such as SIFT (Scale-invariant Feature Transform), SURF (Speeded Up Robust Features), PCA (Principal Component Analysis), and LDA (Linear Discriminant Analysis). Also, for example, the identified entities may include identified characters within the video/episode and the identified objects may include specific objects such as sword in the video/episode. According to one embodiment, the speech-to-text algorithms and the image recognition algorithms may be part of a machine learning model/algorithm associated with the recap generator program 108A, 108B. Furthermore, the recap generator program 108A, 108B may correlate the audio content with the video content such as by correlating the identified entities and objects with the dialogue based on the timestamp data. In turn, based on the correlated data, the recap generator program 108A, 108B may identify the timestamp when a certain character and/or object appears, and when a character speaks a certain line.

Thereafter, at 226 and 224, the recap generator program 108A, 108B may use a topic modeling algorithm and a change point algorithm, respectively, to identify topics and changes in topics in a video/episode. According to one embodiment, the recap generator program 108A, 108B may use known machine learning topic modeling algorithms/techniques as well as known change point algorithms/techniques such as Latent Dirichlet Allocation (LDA) and Bayesian modeling, respectively. Furthermore, the topic modeling algorithms and change point algorithms may also be part of an overall machine learning model associated with the recap generator program 108A, 108B which, as previously described, may also include the speech-to-text algorithms and the image recognition algorithms. According to one embodiment, the recap generator program 108A, 108B may feed the transcribed audio, the identified entities and objects, and the timestamp data into the machine learning model. Thereafter, based on the transcribed audio, the identified entities and objects, and the timestamp data, the recap generator program 108A, 108B may use the topic modeling algorithms and change point algorithms to identify topics and detect changes in topics in the video/episode. In turn, based on the identified topics and changes in topics for a given video/episode, the recap generator program 108A, 108B may individually group the identified topics for the video/episode. According to one embodiment, each topic grouping may be representative of a given scene in a video/episode, and the change in topics may be representative of a change of scene in the video/episode. Furthermore, the recap generator program 108A, 108B may also include/correlate the corresponding entities, objects, and audio content for a given topic grouping (i.e. scene). As such, the recap generator program 108A, 108B may use a topic grouping (such as Topic A depicted in 228) to represent data including the topic, entities, objects, and timestamp for a given scene.

For example, based on the identified entities and objects at a given timestamp of a video/episode that may be fed into the machine learning model, the recap generator program 108A, 108B may identify an entity, such as character A, and an object such as a sword. Furthermore, based on the transcribed audio in a time range that may include the given timestamp, the recap generator program 108A, 108B may identify sounds and dialogue that may correspond to a battle. As such, using the topic modeling algorithms and change in topic algorithms associated with the machine learning model, the recap generator program 108A, 108B may determine that, for a timestamp and range of 43:46-44:00 in the video/episode, character A is engaging in a battle. As such, the recap generator program 108A, 108B may determine that the time of 43:46-44:04 represents a topic that includes a battle scene/clip involving character A. As such, the recap generator program 108A, 108B may use the topic groupings for each video/episode, as well as the correlated and identified entities/objects and transcribed audio, to identify a respective scene and/or clip in the video/episode. In turn, and as depicted at 228 in FIG. 2A, the recap generator program 108A, 108B may generate a list of scenes, whereby the list of scenes may be categorized according to the topics and may also include the entities, objects, and timestamp data. Therefore, each time a video/episode is released and/or added to the episodic collection of videos/episodes, the recap generator program 108A, 108B may process the video/episode according to the operational flowchart 200A described in FIG. 2A and thereby generate a list of scenes corresponding to the topics and entities covered in each video/episode. For example, and as depicted at 228, the recap generator program 108A, 108B may process a received video/episode and thereby generate a list of scenes/topics for that received video/episode, whereby each topic (i.e. Topic A, Topic B . . . Topic n) may also include corresponding data on the entities and objects associated with the topic as well as timestamp data.

Furthermore, the recap generator program 108A, 108B may track user viewership and history of videos/episodes. For example, the recap generator program 108A, 108B may track when a user views the episodic content such as by tracking which videos/episodes (or specific content within episodes) are viewed by the user and when the videos/episodes are viewed. More specifically, the recap generator program 108A, 108B may track user viewership by tracking whether a user accesses a video/episode, for example, by detecting a user clicking a play button associated with the video/episode. The recap generator program 108A, 108B may also track whether a user views specific scenes/clips in the video/episode by tracking the timestamp data as the user views the video/episode. For example, based on the tracked user access, the recap generator program 108A, 108B may determine that a user accessed season 1 episode 3 of a television series but only watched approximately half of the episode based on the tracked timestamp data. The recap generator program 108A, 108B may also track time spent in between watching videos/episodes. Specifically, and as previously described, binge-watching has become a common method among users for streaming/consuming episodic content (e.g. a series of videos/episodes), whereby the process of binge-watching may include watching a series of episodes for a prolonged time span within one sitting. Therefore, the recap generator program 108A, 108B may track whether the user is watching videos/episodes back-to-back with no break in between (for example, by detecting automatic starting of a next episode or a user clicking a next episode button at the end of an episode), watching videos/episodes within a short period of time (which may be based on a configurable time range, for example, watching an episode within one day of a previous/preceding episode), and/or watching a video/episode after a prolonged period of time (which may also be based on a configurable time range, such as watching an episode after 24 hours from the previous/preceding episode).

Referring now to FIG. 2B, and during runtime and implementation, the recap generator program 108A, 108B may track a user's intention to view a video/episode. According to one embodiment, the intended video/episode may be an unviewed video/episode by the user. As similarly described, the recap generator program 108A, 108B may track the user's intention to view a video/episode of television series by, for example, tracking selection of the video/episode by detecting a user clicking on a play button associated with the video/episode, detecting a user scrolling over a title of the video/episode, and/or detecting a user accessing a menu that includes a list of videos/episodes associated with the television series (indicating a user's intention to continue watching from a point in time where a user may have left off). As depicted at 230 in FIG. 2B, the recap generator program 108A, 108B may automatically determine, or may have already automatically determined based on the pre-processing described in FIG. 2A, a list of scenes in the video/episode that the user intends to watch, whereby the list of scenes may be representative of a list of topics and entities that may appear in the video/episode. As such, and as depicted at 232, in response to detecting a user's intention to view the episode/video (hereinafter, the intended video/episode or current video/episode), the recap generator program 108A, 108B may automatically determine a list of previously viewed or past videos/episodes and content, and more specifically, previously viewed topics/scenes and entities that the user may have viewed and that correspond to or match the topics and entities in the intended video/episode. For example, the recap generator program 108A, 108B may use the identified topics and entities in the intended video/episode to identify matching topics and entities in the previously viewed videos/episodes, and/or according to one embodiment, to identify matching topics and entities in past (i.e. unviewed) videos/episodes regardless of a user's viewership history.

According to one embodiment, the recap generator program 108A, 108B may determine a match between topics and entities based on a confidence score and/or configurable threshold that may be implemented using the machine learning model as described above, whereby the machine learning model may also include known machine learning algorithms to recognize certain types of data and patterns in data. For example, the recap generator program 108A, 108B may determine a match between topics (i.e. scenes) in the intended video/episode to topics in one or more previously viewed videos/episodes based on a corresponding amount of matching dialogue and a corresponding amount of matching entities between the topics. As previously described, the recap generator program 108A, 108B may represent a match based a confidence score, which may be configurable using a user interface associated with the recap generator program 108A, 108B. For example, the recap generator program 108A, 108B may present/display a user interface to enable a user to set a threshold percentage that is necessary for determining a match. More specifically, for example, a match be set and determined based on a threshold percentage of greater than 80% (i.e. >80%), whereby a match is determined when a topic including certain dialogue and entities in the intended video/episode has a greater than 80% match to a topic and including certain dialogue and entities in one or more previously viewed videos/episodes. Accordingly, the greater the threshold percentage, the less the amount of scenes that are considered a match. Conversely, the lesser the threshold percentage, the greater the amount of scenes that are considered a match. As such, the threshold percentage may determine how many scenes are considered a match, and therefore, may also determine how many scenes (or more specifically, video footage from the scenes) are selected for generating a personalized recap video, which includes a compilation of video footage from the matching scenes.

As previously described at 232 in FIG. 2B, in response to detecting a user's intention to view the intended episode/video, the recap generator program 108A, 108B may automatically determine a list of previously viewed or past videos/episodes, and more specifically, previously viewed scenes that the user may have viewed that correspond to the topics and entities in the intended video/episode. However, according to another embodiment, in response to detecting the user's intention to view the intended episode/video, and before determining a list of previously viewed or past videos/episodes, the recap generator program 108A, 108B may first automatically identify an amount of time that has elapsed since a user has viewed a previous (i.e. preceding) video/episode that immediately precedes the intended video/episode. Specifically, and as previously described, the recap generator program 108A, 108B may track time spent in between watching videos/episodes, such as by tracking whether the user is watching videos/episodes back-to-back with no break in between (for example, by detecting automatic starting of a next episode 7 or a user clicking a next episode button for episode 7 at the end of an episode 6), watching videos/episodes within a short period of time (which may be based on a configurable time range using the user interface, for example, watching an episode within one day of a previous episode), and/or watching a video/episode after a prolonged period of time (which may also be based on a configurable time range using the user interface, such as watching an episode after 24 hours from the previous episode).

In turn, the recap generator program 108A, 108B may use the amount of time that has elapsed since the user has viewed the previous video/episode that immediately precedes the intended video/episode as a determining factor on whether to generate a personalized recap video. The recap generator program 108A, 108B may also use the time lapse from when a user has watched previous videos/episodes to directly drive how much detail is included in the personalized recap. For example, based on a configurable setting, in response to the recap generator program 108A, 108B detecting that the user intends to watch the intended video/episode right after the immediately preceding episode (such as by detecting automatic starting of the intended episode from the previous episode), the recap generator program 108A, 108B may determine that there is no need for a personalized recap video given that the user may have an idea on what is going in the television series based on the previous episode being fresh in the user's mind. According to one embodiment, the recap generator program 108A, 108B may present the configurable setting in the user interface to allow incorporation of the amount of time elapsed between videos/episodes in the determination to begin a process for generating the personalized recap video. Thus, for example, the recap generator program 108A, 108B may base the determination to begin the process for generating the personalized recap video based on different configurable settings such as a setting to only generate a personalized recap video in response to the elapsed time since viewing the previous (i.e. immediately preceding) video/episode being 3 hours, or 6 hours, or 24 hours, etc. According to one embodiment, the recap generator program 108A, 108B may also include default settings and/or may use the machine learning model to determine when to generate the personalized recap video based on the time elapsed. For example, the machine learning model may detect a user's tendency to go back to a previously viewed episode before viewing an intended/current episode after at least an elapsed time of 6 hours. As such, the recap generator program 108A, 108B may use the machine learning model to determine to generate the personalized recap video based on a determination that the elapsed time is greater or equal to 6 hours.

According to another embodiment, and as previously described, the recap generator program 108A, 108B may also use the time elapsed from when a user has watched previous videos/episodes to directly drive how much detail is included in the personalized recap. Specifically, the time elapsed may be based on configurable setting that is set using the user interface. Therefore, similarly, the recap generator program 108A, 108B may base the determination of how much detail is included in the personalized recap video based on different configurable settings such as a time elapse setting of 3 hours, or 6 hours, or 24 hours, etc. Also, according to one embodiment, the amount of detail in the personalized recap video may be based on a timing metric. For example, more content/detail in the personalized recap video may result in a longer personalized recap video (such as 1 minute and 30 seconds) whereas less content/detail may result in a shorter personalized recap video (such as 20 seconds). According to one embodiment, the amount of detail/time in the personalized recap video may be configured by the user using the user interface as well, whereby the recap generator program 108A, 108B may enable a user to directly set the time limit of the personalized recap video (such as a time of 45 seconds) and correlate the time limit of the personalized recap video with the time elapsed from watching a previous video/episode (such as, after just 2 hours from watching a previous video/episode, set personalized recap video to 20 seconds). Thus, for example, based on a configurable setting, in response to the recap generator program 108A, 108B detecting that the user is intending to watch the intended video/episode after a short time of 2 hours from watching multiple preceding episodes, the recap generator program 108A, 108B may determine to generate a personalized recap video, however, the personalized recap video may be 20 seconds long as opposed to maybe 1 minute (based on a configured setting) given that the user may have an idea on what is going in the television series based on the multiple previous episodes being fresh in the user's mind. Therefore, the time elapsed from when a user has watched previous videos/episodes may directly drive how much detail is included in the personalized recap. Other drivers of how much content/detail is included in the personalized recap video may also include how many other videos/episodes the user has watched before watching the intended video/episode, complexity of a series, and demographics.

As depicted at 234 in FIG. 2B, the recap generator program 108A, 108B may generate the personalized recap video based on the matching scenes from the previously viewed videos/episodes that may be relevant to the intended video/episode that the user intends to watch. According to another embodiment, and as previously described, the recap generator program 108A, 108B may generate the personalized recap video based on the matching scenes from past videos/episodes regardless of viewership that may be relevant to the intended video/episode that the user intends to watch. Specifically, based on a list of scenes from the previously viewed or past videos/episodes, the recap generator program 108A, 108B may extract a subset of scenes from the list based on relevancy to the intended video/episode and generate the personalized recap video based on video footage from the subset of scenes. According to one embodiment, the recap generator program 108A, 108B may arrange the subset of relevant scenes in the personalized recap video in ascending order, such as from least recent to most recent. As such, the personalized recap video may recap footage, characters, scenes, topics, and other information that may be relevant/pertinent to scenes in the intended video/episode and, in turn, may be used to annotate the intended video/episode. According to one embodiment, the recap generator program 108A, 108B may generate the personalized recap video by compiling the matching/relevant scenes into one video. Also, according to one embodiment, the recap generator program 108A, 108B may limit the personalized recap video to a specific time block, such as by limiting the personalized recap video to 30 seconds, and may use the machine learning model to cutdown one or more of the matching/relevant scenes to the most relevant footage/clips to the intended video/episode in order to fit the specific time block. According to one embodiment, the specific time block may be configurable using the user interface such that the personalized recap video may be set at certain time limit. Furthermore, the recap generator program 108A, 108B may also present a configurable option to specifically target footage of a specific entity and/or specific topic before generating the personalized recap video.

According to one embodiment, the recap generator program 108A, 108B may annotate the intended video/episode by presenting the generated personalized recap video, which includes the compilation of relevant video footage/clips from the previously viewed videos/episodes, as an introduction to the intended video/episode. Therefore, in response to a user clicking on a play button associated with the intended video/episode, the recap generator program 108A, 108B may automatically insert the personalized recap video/episode into an introduction of the intended video/episode with the generated and. According to another embodiment, the recap generator program 108A, 108B may generate multiple personalized recap videos and intersplice the matching/relevant footage associated with each personalized recap video throughout the intended video/episode based on its relevancy to a given scene. Specifically, and as previously described, the recap generator program 108A, 108B may identify topics and changes in topics (i.e. different scenes) for a given video/episode, such as for the intended video/episode. Therefore, according to one embodiment, as the user watches the intended video/episode, the recap generator program 108A, 108B may generate and introduce multiple personalized recap videos in the intended video/episode with each video corresponding to a topic/scene in the intended video/episode. For example, according to one embodiment, the recap generator program 108A, 108B may intersplice each personalized recap video into the intended video/episode by detecting a timestamp for a new topic/scene in the intended video/episode and thereby present a personalized recap video (from the multiple personalized recap videos) as an introduction to the specific topic/scene. In yet another embodiment, the recap generator program 108A, 108B may present a pop-up style overlay on for each new topic/scene in the intended video/episode while the scene appears, whereby the pop-up style overlay may include selectable graphical text asking/prompting the user to, for example, decide to "display a personalized recap video for current scene? Yes or No" Accordingly, in response to the user selecting "Yes", the recap generator program 108A, 108B may display the personalized recap video relevant to that current scene.

It may be appreciated that FIGS. 1-2B provide only illustrations of one implementation and does not imply any limitations with regard to how different embodiments may be implemented. Many modifications to the depicted environments may be made based on design and implementation requirements. For example, the recap generator program 108A, 108B may also include with the user interface an option for the user to manually indicate what previous videos/episodes a user has watched, for example, by presenting on the user interface a list of the videos/episodes with a corresponding box to click on and resultingly check to indicate that the user has viewed a particular video/episode.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3:
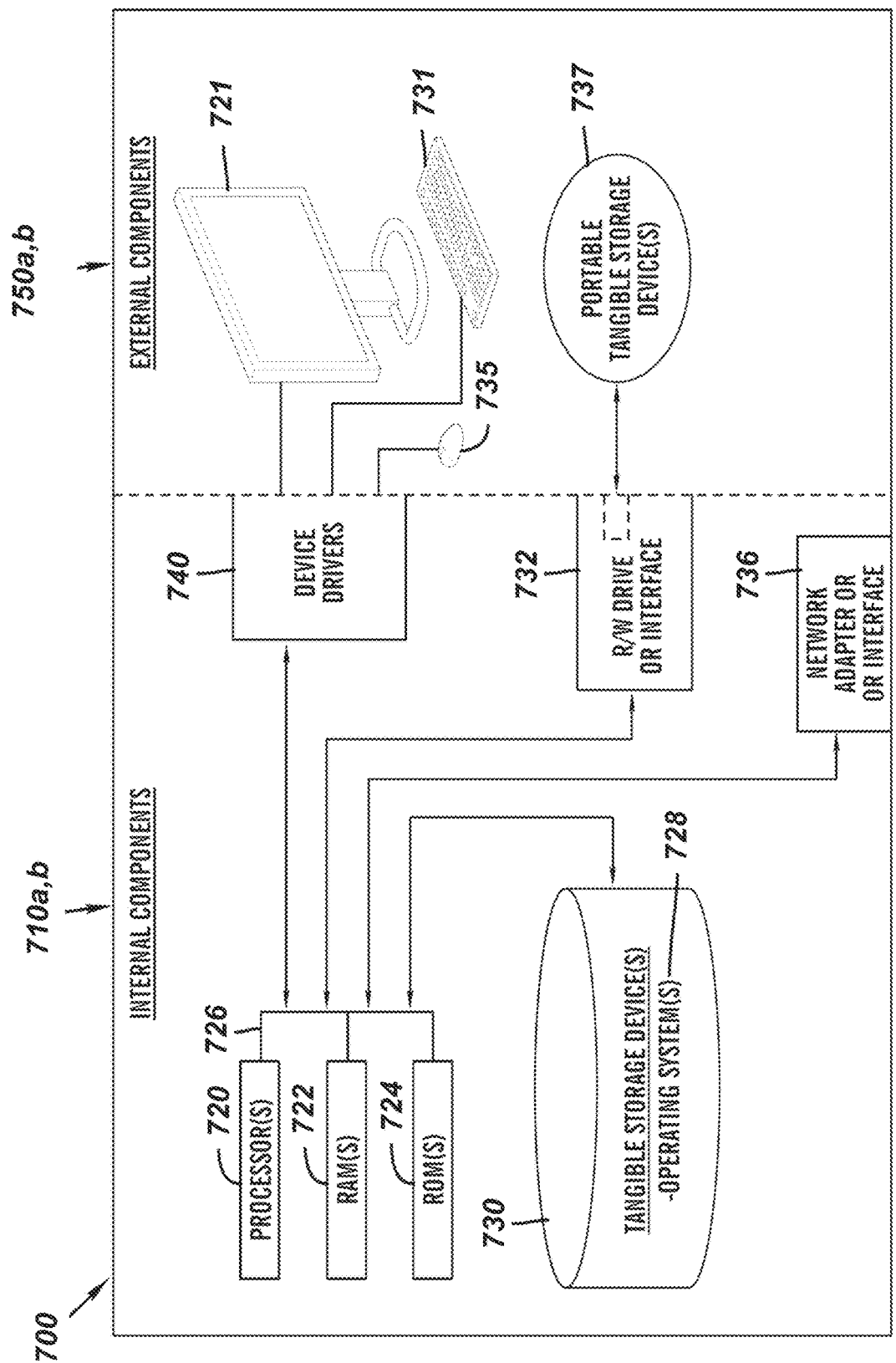
FIG. 3 is a block diagram of the system architecture of the program for automatically and cognitively annotating a video with a generated and personalized recap video according to one embodiment.

FIG. 3 is a block diagram 700 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 710 *a, b* and 750 *a, b* is representative of any electronic device capable of executing machine-readable program instructions that may include a computer 102 (710a and 750a) and/or a server 112 (710b and 750b). Data processing system 710 a, b and 750 a, b may be representative of a smart phone, a computer system, PDA, or other electronic devices. Examples of computing systems, environments, and/or configurations that may represented by data processing system 710 a, b and 750 a, b may include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710 a, b and external components 750 a, b illustrated in FIG. 3. Each of the sets of internal components 710 a, b includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the Recap generator program 108A (FIG. 1) in client computer 102 (FIG. 1), and the Recap generator program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 3, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 a, b, also includes a RAY drive or interface 732 to read from and write to one or more portable computer-readable tangible storage devices 737 such as a CD-ROM, DVD, memory stick, magnetic tape, magnetic disk, optical disk or semiconductor storage device. A software program, such as a recap generator program 108A and 108B (FIG. 1), can be stored on one or more of the respective portable computer-readable tangible storage devices 737, read via the respective R/W drive or interface 732, and loaded into the respective hard drive 730.

Each set of internal components 710 a, b also includes network adapters or interfaces 736 such as a TCP/IP adapter cards, wireless Wi-Fi interface cards, or 3G or 4G wireless interface cards or other wired or wireless communication links. The recap generator program 108A (FIG. 1) and software program 114 (FIG. 1) in client computer 102 (FIG. 1), and the recap generator program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the recap generator program 108A (FIG. 1) and software program 114 (FIG. 1) in client computer 102 (FIG. 1) and the recap generator program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750 a, b can include a computer display monitor 721, a keyboard 731, and a computer mouse 735. External components 750 a, b can also include touch screens, virtual keyboards, touch pads, pointing devices, and other human interface devices. Each of the sets of internal components 710 a, b also includes device drivers 740 to interface to computer display monitor 721, keyboard 731, and computer mouse 735. The device drivers 740, RAY drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
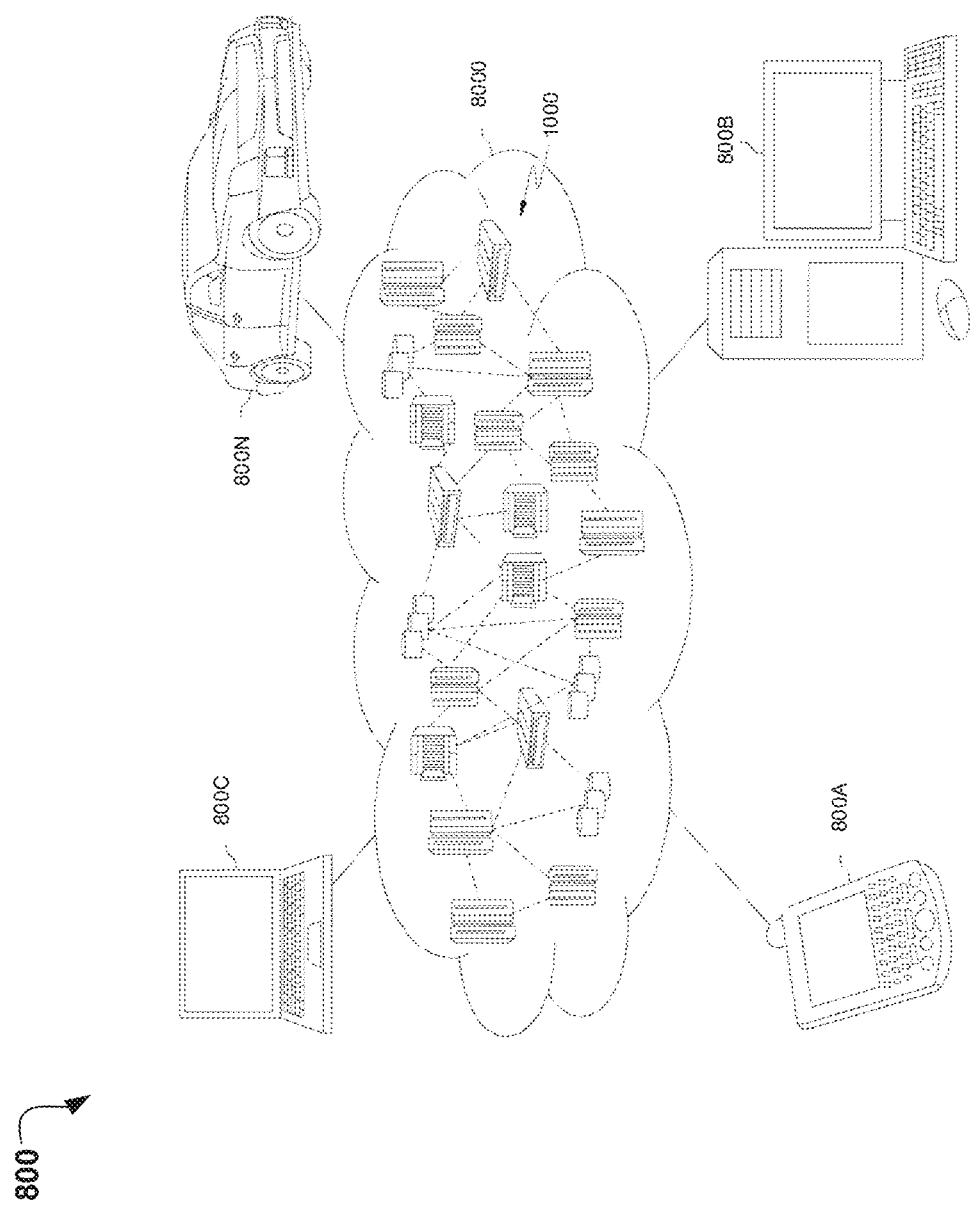
FIG. 4 is a block diagram of an illustrative cloud computing environment including the computer system depicted in FIG. 1, in accordance with an embodiment of the present disclosure.

Referring now to FIG. 4, illustrative cloud computing environment 800 is depicted. As shown, cloud computing environment 800 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud 8000 to offer infrastructure, platforms and/or software as services for which a cloud consumer does not need to maintain resources on a local computing device. It is understood that the types of computing devices 800A-N shown in FIG. 4 are intended to be illustrative only and that computing nodes 100 and cloud 8000 can communicate with any type of computerized device over any type of network and/or network addressable connection (e.g., using a web browser).

Figure 5:
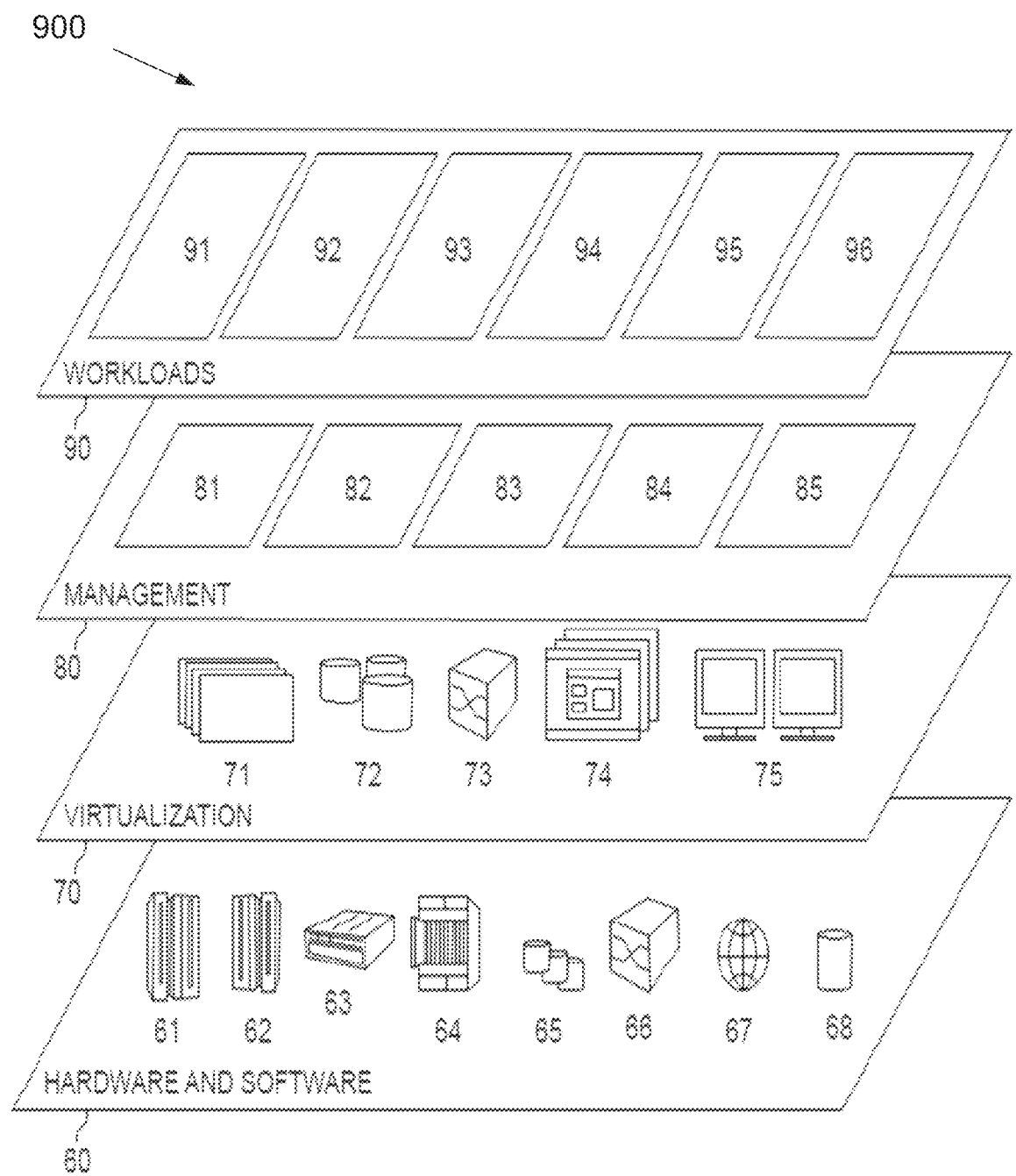
FIG. 5 is a block diagram of functional layers of the illustrative cloud computing environment of FIG. 4, in accordance with an embodiment of the present disclosure.

Referring now to FIG. 5, a set of functional abstraction layers 900 provided by cloud computing environment 800 (FIG. 4) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Recap generator 96. A recap generator program 108A, 108B (FIG. 1) may be offered "as a service in the cloud" (i.e., Software as a Service (SaaS)) for applications running on computing devices 102 (FIG. 1) and may automatically and cognitively annotate a video with a generated and personalized recap video based on previously viewed video content.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically annotating an intended video with at least one personalized recap video based on previously viewed videos, comprising:

automatically tracking user viewership of the previously viewed videos, and in response to detecting an intention to view the intended video, automatically generating the at least one personalized recap video based on a configurable amount of time elapsed since the user viewership of a previously viewed video immediately preceding the intended video, wherein automatically generating the at least one personalized recap video further comprises:

automatically identifying and extracting a subset of video footage from one or more of the previously viewed videos based on the tracked user viewership and based on a determined relevancy of the subset of video footage to unwatched content in the intended video, wherein automatically identifying and extracting the subset of video footage further comprises automatically identifying a topic and an entity appearing at various points in the unwatched content, and extracting the subset of video footage matching and comprising the identified topic and the entity from one or more previously viewed videos;

generating the at least one personalized recap video by compiling and sorting the extracted subset of video footage from the one or more previously viewed videos into a compilation video; and annotating the intended video with the at least one personalized video by presenting the at least one personalized recap video on the intended video.

2. The computer-implemented method of claim 1, wherein the previously viewed videos and the intended video are part of an episodic series of videos, wherein the previously viewed videos precede the intended video, and wherein the intended video comprises an unviewed video.

3. The computer-implemented method of claim 2, further comprising:

in response to receiving the episodic series of videos:
transcribing audio from each video associated with the episodic series of videos using a speech-to-text algorithm to individually produce an audio transcript of each video with timestamp data; and for each video, identifying entities and objects appearing at various points in a video using an image recognition algorithm and correlating the identified entities and objects with the transcribed audio and timestamp data for the video, wherein the identified entities identify characters in the episodic series of videos.

4. The method of claim 3, further comprising:
for each video associated with the episodic series of videos, using machine learning to perform topic modeling on each video based on the audio transcript and the identified entities and objects to identify topics and changes in topics for each video, wherein the topics represents scenes in each video, and wherein the changes in topics represent changes in scenes for each video.

5. The computer-implemented method of claim 4, wherein automatically identifying and extracting the subset of video footage from one or more of the previously viewed videos based on the tracked user viewership and based on the determined relevancy of the subset of video footage to the unwatched content in the intended video further comprises:

determining a match between the topics and the identified entities between the one or more previously viewed videos and the intended video, wherein the determined match is based on a threshold confidence score.

6. The computer-implemented method of claim 1, wherein annotating the intended video with the at least one personalized video further comprises:
presenting the at least one personalized recap video as an introduction on the intended video.

7. The computer-implemented method of claim 1, further comprising:
generating a plurality of personalized recap videos for the intended video; and
intersplicing each personalized recap video associated with the plurality of personalized recap videos at different times on the intended video based on the determined relevancy of each personalized recap video to a scene in the intended video.

8. A computer system for automatically annotating an intended video with at least one personalized recap video based on previously viewed videos, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

automatically tracking user viewership of the previously viewed videos, and in response to detecting an intention to view the intended video, automatically generating the at least one personalized recap video based on a configurable amount of time elapsed since the user viewership of a previously viewed video immediately preceding the intended video, wherein automatically generating the at least one personalized recap video further comprises:

automatically identifying and extracting a subset of video footage from one or more of the previously viewed videos based on the tracked user viewership and based on a determined relevancy of the subset of video footage to unwatched content in the intended video, wherein automatically identifying and extracting the subset of video footage further comprises automatically identifying a topic and an entity appearing at various points in the unwatched content, and extracting the subset of video footage matching and comprising the identified topic and the entity from one or more previously viewed videos;

generating the at least one personalized recap video by compiling and sorting the extracted subset of video footage from the one or more previously viewed videos into a compilation video; and annotating the intended video with the at least one personalized video by presenting the at least one personalized recap video on the intended video.

9. The computer system of claim 8, wherein the previously viewed videos and the intended video are part of an episodic series of videos, wherein the previously viewed videos precede the intended video, and wherein the intended video comprises an unviewed video.

10. The computer system of claim 9, further comprising:
in response to receiving the episodic series of videos:
transcribing audio from each video associated with the episodic series of videos using a speech-to-text algorithm to individually produce an audio transcript of each video with timestamp data; and for each video, identifying entities and objects appearing at various points in a video using an image recognition algorithm and correlating the identified entities and objects with the transcribed audio and timestamp data for the video, wherein the identified entities identify characters in the episodic series of videos.

11. The computer system of claim 10, further comprising:
for each video associated with the episodic series of videos, using machine learning to perform topic modeling on each video based on the audio transcript and the identified entities and objects to identify topics and changes in topics for each video, wherein the topics represents scenes in each video, and wherein the changes in topics represent changes in scenes for each video.

12. The computer system of claim 11, wherein automatically identifying and extracting the subset of video footage from one or more of the previously viewed videos based on the tracked user viewership and based on the determined relevancy of the subset of video footage to the unwatched content in the intended video further comprises:
determining a match between the topics and the identified entities between the one or more previously viewed videos and the intended video, wherein the determined match is based on a threshold confidence score.

13. The computer system of claim 8, wherein annotating the intended video with the at least one personalized video further comprises:
presenting the at least one personalized recap video as an introduction on the intended video.

14. The computer system of claim 8, further comprising:
generating a plurality of personalized recap videos for the intended video; and
intersplicing each personalized recap video associated with the plurality of personalized recap videos at different times on the intended video based on the determined relevancy of each personalized recap video to a scene in the intended video.

15. A computer program product for automatically annotating an intended video with at least one personalized recap video based on previously viewed videos, comprising:
one or more tangible computer-readable storage devices and program instructions stored on at least one of the one or more tangible computer-readable storage devices, the program instructions executable by a processor, the program instructions comprising:
automatically tracking user viewership of the previously viewed videos, and in response to detecting an intention to view the intended video, automatically generating the at least one personalized recap video based on a configurable amount of time elapsed since the user viewership of a previously viewed video immediately preceding the intended video, wherein automatically generating the at least one personalized recap video further comprises:
automatically identifying and extracting a subset of video footage from one or more of the previously viewed videos based on the tracked user viewership and based on a determined relevancy of the subset of video footage to unwatched content in the intended video, wherein automatically identifying and extracting the subset of video footage further comprises automatically identifying a topic and an entity appearing at various points in the unwatched content, and extracting the subset of video footage matching and comprising the identified topic and the entity from one or more previously viewed videos;
generating the at least one personalized recap video by compiling and sorting the extracted subset of video footage from the one or more previously viewed videos into a compilation video; and
annotating the intended video with the at least one personalized video by presenting the at least one personalized recap video on the intended video.

16. The computer program product of claim 15, wherein the previously viewed videos and the intended video are part of an episodic series of videos, wherein the previously viewed videos precede the intended video, and wherein the intended video comprises an unviewed video.

17. The computer program product of claim 16, further comprising:
in response to receiving the episodic series of videos:
transcribing audio from each video associated with the episodic series of videos using a speech-to-text algorithm to individually produce an audio transcript of each video with timestamp data; and
for each video, identifying entities and objects appearing at various points in a video using an image recognition algorithm and correlating the identified entities and objects with the transcribed audio and timestamp data for the video, wherein the identified entities identify characters in the episodic series of videos.

18. The computer program product of claim 17, further comprising:
for each video associated with the episodic series of videos, using machine learning to perform topic modeling on each video based on the audio transcript and the identified entities and objects to identify topics and changes in topics for each video, wherein the topics represents scenes in each video, and wherein the changes in topics represent changes in scenes for each video.

19. The computer program product of claim 18, wherein automatically identifying and extracting the subset of video footage from one or more of the previously viewed videos based on the tracked user viewership and based on the determined relevancy of the subset of video footage to the unwatched content in the intended video further comprises:
determining a match between the topics and the identified entities between the one or more previously viewed videos and the intended video, wherein the determined match is based on a threshold confidence score.

20. The computer program product of claim 15, wherein annotating the intended video with the at least one personalized video further comprises:
presenting the at least one personalized recap video as an introduction on the intended video.

* * * * *